May 6, 1930. A. T. PALMER 1,757,137
RAIL JOINT
Original Filed Sept. 11, 1926
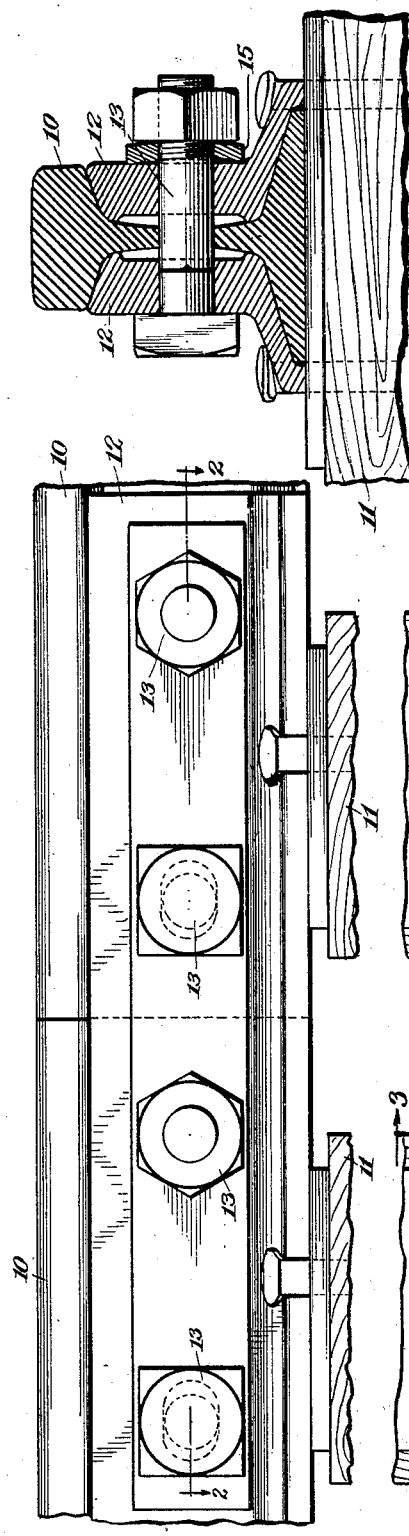
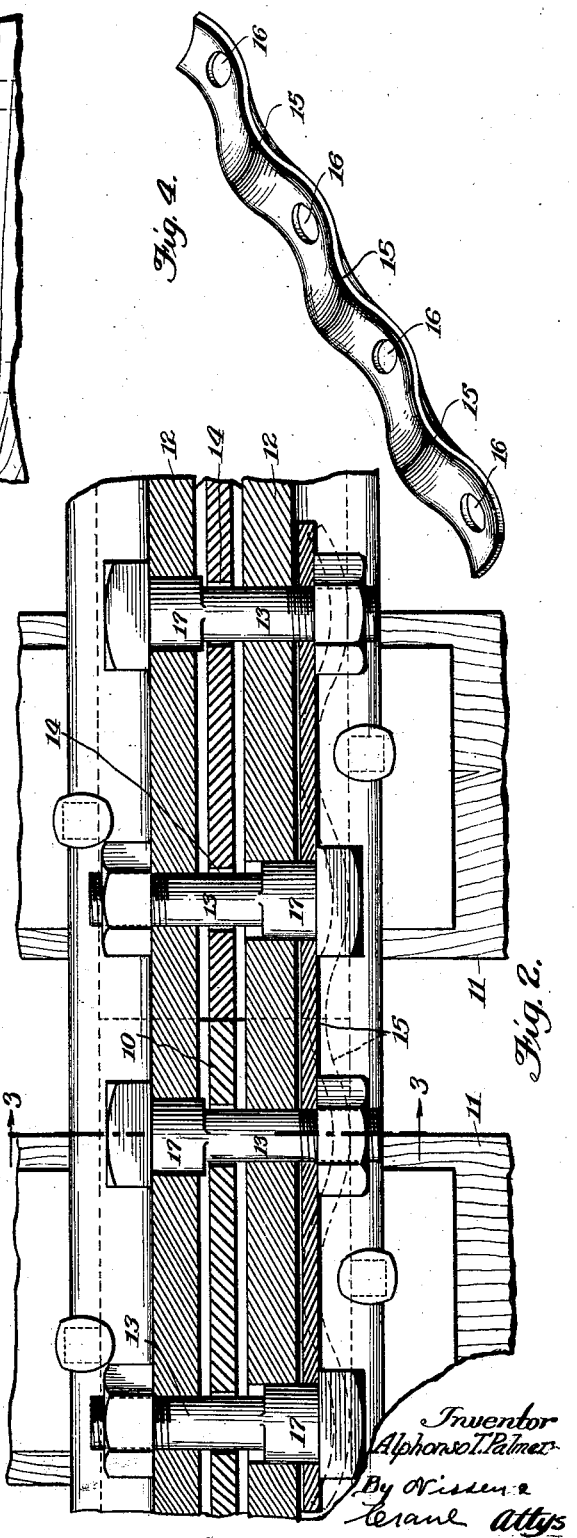
Inventor
Alphonso T. Palmer Patented May 6, 1930

1,757,137

UNITED STATES PATENT OFFICE

ALPHONSO T. PALMER, OF CHICAGO, ILLINOIS

RAIL JOINT

Application filed September 11, 1926, Serial No. 134,881. Renewed October 4, 1929.

This invention relates to means for joining the ends of railway rails, and has for its object the provision of a joint which will hold the rails firmly in abutting relation, avoiding relative movement of the ends of the rails, thus prolonging the life of the joint and preventing shock to the cars passing over the rails.

A further object is to provide a joint the parts of which will be economical to manufacture and install, which shall have few parts and which will not become loose from the jar and vibration incident to the passage of trains thereover.

Other objects of the invention will appear from the following description.

The invention is exemplified in the combination and arrangement of parts shown in the accompanying drawing and described in the following specification, and it is more particularly pointed out in the appended claims.

In the drawing,—

Fig. 1 is a side elevation of a joint embodying one form of the present invention.

Fig. 2 is a section on line 2—2 of Fig. 1.

Fig. 3 is a section on line 3—3 of Fig. 2.

Fig. 4 is a perspective view of my improved clamping bar.

The numeral 10 designates the abutting ends of railway rails supported on ties 11 in the usual manner. Angle plates 12 are arranged to overlap the joint between the ends of the rails 10 and are provided with inclined upper and lower faces for engaging the lower surface of the head of the rail and the top surfaces of the rail flange. The plates 12 are drawn into the recesses in the sides of the rails 10 by bolts 13. It will be seen that so long as the angle plates are held tightly in position they will prevent any vertical or lateral relative movement of the ends of the rails 10. The openings 14 in the rail web are larger than the bolts 13 to permit longitudinal movement of the rails due to expansion and contraction. The angle plates 12 will, however, prevent any transverse movement provided the angle plates are always kept tightly clamped in the recesses in the sides. It is therefore of great importance that the angle plates be held tightly at all times for if they are permitted to work loose there will be relative movement of the ends of the rails as the car wheels pass from one rail to the other and this relative movement will set up vibration which produces wear and in time destroys the rail joint. The vibration due to the relative movement of the rail ends is also one of the greatest sources of wear and tear on the rolling stock as well as a source of disturbance to passengers.

The present invention provides a powerful spring action on the bolts 13, which automatically holds the plates 12 tightly in position at all times even though the nuts on the bolts should be loosened. However, the spring force exerted on the bolts is sufficiently great to prevent the nuts from loosening under the action of the trains passing over the joint or other influences to which the joint is subjected. To produce this spring force, a plate or bar 15 is placed against the outer face of one of the angle plates 12 and is provided with perforations 16 through which the bolts 13 extend. The bolts 13 are commonly provided with elliptical shank portions 17 to hold the bolts from rotating while the nuts are being tightened. Alternate holes in the plate 15 may therefore be made elliptical to receive the elliptical shanks 17. The bolts are commonly alternated in direction so that every other opening 16 may be elliptical and the alternate openings may be round. The plate 15 is made of comparatively heavy spring steel and may be approximately from $\frac{3}{16}$ to $\frac{1}{4}$ inch in thickness. The thickness may, of course, be varied to suit particular conditions. The plate is provided with a series of transverse curves or undulations, as indicated in the broken lines in Fig. 2, which shows the form of the plate before the nuts are tightened. The spring plate is curved outwardly away from the angle plate at each point where a bolt passes through the spring plate, so that when the bolts are tightened the plate will be placed under strain, exerting a powerful tension on the bolt. When completely tightened, the spring plate will take approximately the position shown in full lines in Fig. 2.

An important feature of the invention is the double curvature of the spring plate 15, as shown in Figs. 3 and 4. The plate is not only provided with a series of undulations, but it is also curved throughout its length about a longitudinal axis. It will be apparent that this longitudinal curvature greatly multiplies the resilient strength of the plate. Each of the convex portions through which the bolts pass is, in effect, a dome so that the strength of the plate is many times that of a simple bar or beam such as is persented by a flat plate.

It is especially important that the rail ends be held in registration at points as close to the ends as possible. It will be readily apparent that force holding the rail in registration is much more effective if applied directly to the rail ends than it would be if applied some distance from the ends of the rails. For this reason the bar 15 is made continuous across the joint and is provided with an inward curve in direct registration with the joint between the ends of the rails. In this way the spring pressure is made operative at the point where it is most effective. This arrangement also makes it possible to use a single piece for supplying the spring tension to the entire joint and for holding all of the nuts in position. The tremendous force which acts continuously on the bolts makes it unnecessary to provide other locking means for the nuts so that a joint can be much more easily assembled than can be done where separate lock washers are required for each nut. This not only is an economical joint which is quickly and easily installed, but the ends of the rails are at all times held in perfect alignment, which greatly increases not only the life of the rails and angle plates but also the life of the rolling stock and the comfort of the passengers.

The use of a single spring for automatically taking up all play and holding the parts of the joint in rigid relation at all times not only increases the efficiency of the joint but greatly reduces the cost of manufacture. The single holding plate can be formed from bar stock with a great saving of expense compared to the manufacture of a number of smaller parts as heretofore employed.

I claim:

1. A rail joint spring comprising an elongated spring plate having four spaced perforations therethrough, said plate being curved throughout its length about an axis extending longitudinally thereof and also being curved about spaced transverse axes to provide undulations, the undulations being extended outwardly toward the convex side of said plate at each of said perforations.

2. A rail joint spring comprising an elongated spring plate having undulations therein distributed longitudinally of said plate and being curved throughout its length about a longitudinally extending axis, said plate having four bolt holes extending therethrough and coinciding with the portions of said plate extending outwardly the greatest amount at the convex side of the plate.

3. The combination with adjacent ends of a pair of railway rails, of angle plates extending across the joint between said rails, four bolts extending through said angle plates and rails, two at each side of said joint, for holding said angle plates and rails together, and a rail joint spring engaging said bolts and having four openings therein through which said bolts pass, said spring being continuous across the joint between said rails and having an outwardly curved portion registering with each of said bolts, the outwardly curved portion of said plate being curved both longitudinally and transversely of said spring to provide approximately spherical portions engaged by said bolts.

4. The combination with adjacent ends of a pair of railway rails and angle plates for holding said rails together, of a spring plate crossing the joint between said rails and having an inwardly directed transverse curve registering with said joint, said plate also having alternating outwardly and inwardly directed curved portions at opposite sides of said first-mentioned inwardly directed curve, said plate having a bolt hole in each of said outwardly directed portions, and bolts passing through said bolt holes, angle plates and rail ends, said spring plate being outwardly curved throughout its length about a longitudinal axis.

5. A spring plate adapted to be used in connecting the adjacent ends of a pair of rails together comprising an elongated plate curved longitudinally and transversely, the longitudinal curvature being substantially serpentine whereas the curvature in a transverse direction is arcuate and substantially uniform throughout the length of said plate, said plate being adapted to lie over the joint between the ends of adjacent rails.

6. A plate adapted to be used in tying together the adjacent ends of a pair of rails comprising a plate having a series of substantially convex portions extending throughout the length thereof, each of said convex portions having an opening therethrough for the reception of a fastening means, said plate being adapted to overlie the joint between the ends of adjacent rails and being sufficiently resilient to permit distortion of said convex portions when a force is exerted on said plate by the fastening means used in connecting the plate to the ends of the adjacent rails.

7. A plate adapted to be used in tying together the adjacent ends of a pair of rails comprising a plate having a series of substantially convex portions extending in substantially the same direction and throughout the length thereof, each of said convex portions having an opening therethrough for the reception of a fastening means, said plate being adapted to overlie the joint between the ends of adjacent rails and being sufficiently resilient to permit distortion of said convex portions when a force is exerted on said plate by the fastening means used in connecting the plate to the ends of the adjacent rails.

In testimony whereof I have signed my name to this specification on this 9th day of September, A. D. 1926.

ALPHONSO T. PALMER.